Feb. 12, 1957 C. J. MILLER 2,781,421

HIGH FREQUENCY AMPLIFIER

Filed May 23, 1952 3 Sheets-Sheet 1

WITNESSES:

Robert C. Baird

R. G. Brodahl

INVENTOR

Coleman J. Miller.

BY

F. E. Browder

ATTORNEY

Feb. 12, 1957 C. J. MILLER 2,781,421

HIGH FREQUENCY AMPLIFIER

Filed May 23, 1952 3 Sheets-Sheet 2

WITNESSES:

E. A. McCloskey

R. G. Brodahl

INVENTOR

Coleman J. Miller.

BY F. E. Browder

ATTORNEY

Feb. 12, 1957 C. J. MILLER 2,781,421

HIGH FREQUENCY AMPLIFIER

Filed May 23, 1952 3 Sheets-Sheet 3

WITNESSES:

John E. Healy

R. G. Brodahl

INVENTOR

Coleman J. Miller

BY

F. E. Browder

ATTORNEY

United States Patent Office 2,781,421
Patented Feb. 12, 1957

2,781,421

HIGH FREQUENCY AMPLIFIER

Coleman J. Miller, Catonsville, Md., assignor to Westinghouse Electric Corporation, East Pittsburgh, Pa., a corporation of Pennsylvania Application May 23, 1952, Serial No. 289,619

12 Claims. (Cl. 179—171)

This invention relates to high power, high frequency amplifiers for radio transmitter applications and the like, and has for its principal object the provision of an amplifier design which will enable the use of a plurality of vacuum tubes in a single circuit of high efficiency and great compactness.

The present application is a continuation-in-part of a pending application of the same inventor, Serial No. 44,631, filed August 17, 1948, now Patent No. 2,697,137, granted December 14, 1954, and assigned to the same assignee.

In order to obtain high power outputs at the higher radio frequencies, for example in the range of from 50 to 1000 megacycles per second, it is generally desirable to provide an output amplifier using a number of tubes in the single output stage. Various methods have been employed for the interconnection of such tubes in order to provide a maximum efficiency without undue sacrifices of space, weight and convenience in operation. All of these prior art methods, however, have involved design compromises which have necessitated less than optimum output or other disadvantages. For example, a two tube amplifier of prior art construction has commonly been designed to operate the tubes in a push-pull circuit which requires shielded tuning elements, for instance in the form of a shielded open-wire line which is not conducive to mechanical simplicity or compactness. The attempt to extend this construction to amplifiers using a plurality of sets of push-pull tubes has involved considerable complication in the direction of shielding of the cathode, filament or heater connections, and the use of extensive bus systems for interconnecting in parallel the corresponding electrodes of the pairs of tubes. Particularly where such amplifiers have employed high power tubes requiring high voltages on certain of their electrodes, the lack of symmetry has involved serious insulation or space problems, and the extensive interconnecting circuits have required more space than is desirable, particularly where compactness is an important feature. At the same time, this lack of symmetry has made it difficult to balance the tubes of each pair with respect to one another, as well as raising the same difficulty with reference to the tubes of different pairs.

It is accordingly an object of the present invention to provide a high frequency, high power, multi-tube amplifier which will overcome the above and other disadvantages of prior constructions, and which will be particularly useful in applications requiring compact, relatively wide-band amplifiers, such as are used in frequency modulation or television transmitters, for example, and especially where such transmitters must be installed in proximity to other equipment, as in airborne installations.

A further object of the invention is to provide an amplifier of the above type in which all of the tubes are connected in parallel, thus achieving a symmetry which is impossible with a multiple array of push-pull amplifier tube sets. Still another object is to provide an amplifier of this kind in which each tube is surrounded by exactly the same mechanical and electrical configuration, and thus contributes an equal share of the output power, if the tubes themselves are balanced or electrically identical. This is of particular importance in a high power amplifier where the individual tubes are so large, and the voltages thereon are so large, that any lack of symmetry in the circuit would be reflected as a substantial lack of equality of applied voltage.

A further object of the invention is to provide an amplifier of the above type in which all of the tubes operate into a single large tank circuit, and in which the parallel connection of the tubes provides the lowest possible output impedance. The use of a single large tank circuit makes it possible to reduce substantially the losses incurred in the interconnection of separate tubes by separate resonant lines, and the effective "Q" of the amplifier tank is thereby increased.

Still an additional object is to provide a mechanical construction of the tank circuit which is very economical to manufacture, since all of the parts thereof are figures of revolution which are adapted to spinning or lathe operations with a minimum of cost as compared with intricate hand-made or hand-assembled configurations. The construction in accordance with the preferred form of my invention provides inherent mechanical support for the vacuum tubes, and renders them essentially unitary, in the finished amplifier, with the tank circuit.

An additional object of the invention is to provide an amplifier of the type described in which a minimum of separate internal connections is required, and in which the necessary by-pass capacitances are provided as incidents, in a sense, to the required conductive or mechanical parts of the assemblage. Such construction not only makes for greater electrical efficiency, but also reduces further the cost of manufacture, since the number of different assembly operations and parts required are reduced.

Another object of the invention is to provide such an amplifier in which the operations of tuning the grid and plate circuits are simplified by the use of inherently balanced and equalized, ganged controls, and in which provision is made for matching the output line to the parallel-connected plates of the vacuum tubes.

The above and other objects and advantages of my invention will best be understood by referring to the following detailed specification of a preferred embodiment thereof, taken in connection with the appended drawings, in which.

Figure 1:
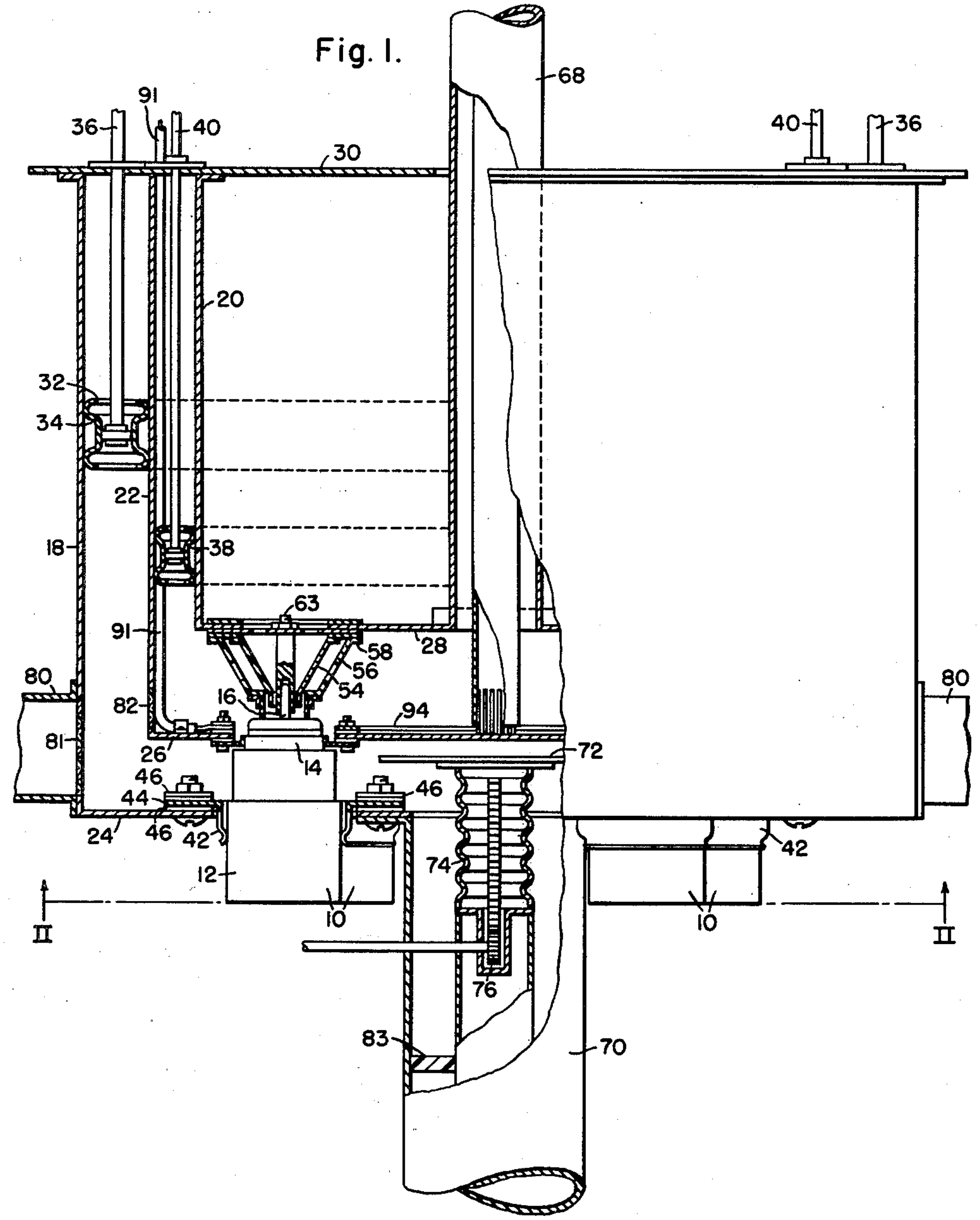
Figure 1 is a side elevation, with parts broken away and parts in section, of a preferred form of the invention.
Figure 2:
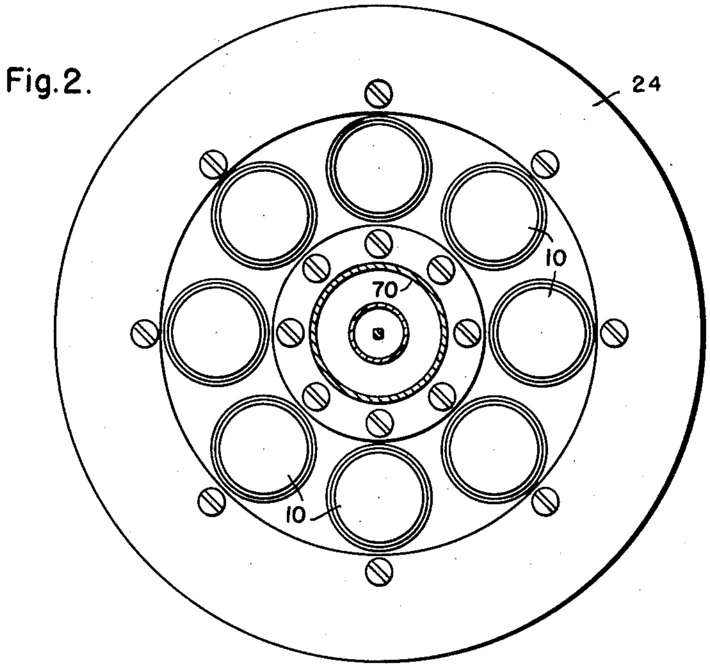
Fig. 2 is a plan view, looking at the bottom of the amplifier of Fig. 1.

Referring now to Figs. 1 and 2 of the drawings, I have illustrated a preferred form of the invention utilizing a plurality (here eight) of high power vacuum tubes arranged in a circular array about the physical axis of a tank circuit formed entirely of figures of revolution. Since all of the tubes are identical, they have been designated in the drawings by the single reference numeral 10, and each comprises a shell portion 12 constituting the plate connection, an inner shell portion 14 constituting the grid connection, and a terminal portion 16 which carries the filament connections. Since the construction of such tubes is in itself well known in the art, the internal details thereof are not illustrated. The tank circuit which is common to all of the tubes is formed in this embodiment by a series of concentric cavities defined by an outer cylindrical wall 18, an inner cylindrical wall 20, and an intermediate cylindrical wall 22 which forms, between the inner and outer walls, the resonant grid and plate tuning cavities.

The cylindrical walls 18 to 22 described above are suitably closed as by annular or disc-like end plates 24, 26 and 28 at their lower ends, and by a common annular plate 30 at their upper ends, the latter being apertured for the passage of a concentric line type of grid input circuit to be described below. Each of the annular plate and grid cavities is individually tuned by means of a concentric tuning bar, annular in shape, which is arranged to slide within the respective cavities, the plate tuning bar herein being designated by numeral 32 and being provided with spring contact fingers 34 adapted to maintain electrical contact with both the walls of this cavity as the bar is moved upwardly or downwardly by the application of tractive effort to a series of spaced actuating rods 36 passing through the end wall 30. A similar annular tuning bar 38 is provided for the grid cavity, and may be adjusted by movement of rods 40 connected thereto. It will be observed that all of the cylindrical walls 18, 20 and 22, and the end walls or plates 24, 26 and 28 are at the same direct current potential, which may conveniently be chosen to be at zero or ground direct current potential, since this enables the required by-pass capacitances to be provide by simple mechanical means now to be described.

Figure 3:
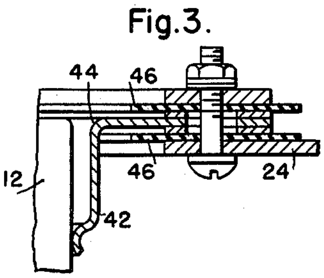
Fig. 3 is an enlarged, fragmentary sectional detail illustrating the manner of by-passing the plate terminals of the vacuum tubes to the appropriate wall of the tank circuit.
Figure 4:
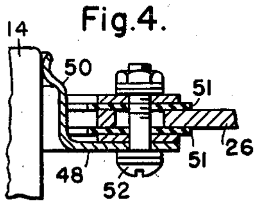
Fig. 4 is a view similar to Fig. 3 of the grid by-pass connection to the tank assembly.

Surrounding a portion of the outer or plate-connection shell 12 of each tube 10, as detailed in Fig. 3, is a ring 42 provide with spring fingers to ensure good contact with the shell, which ring has a flange portion 44 which may overlie a portion of end wall or plate 24 surrounding the circular aperture therein which accommodates the tube, and this flange is bolted or otherwise secured to said plate 24, being separated therefrom by a layer of a suitable dielectric material 46 which therefore forms a capacitor between the plate connection shell 12 of each tube, to ground potential represented by the plate 24. Similarly, as shown in Fig. 4, the grid connection of each tube is by-passed to ground by a capacitance provided between the flange 48 of a spring contact ring 50 in contact with the grid shell 14 and the plate 26, a suitable dielectric being indicated at 51. In both of these capacitances, a suitable value may be chosen by proper selection of the thickness of the dielectric, or the use of a parallel combination of capacitances formed by the use of additional layers of dielectric and auxiliary plates, connected electrically in parallel through the common conductor formed by the mounting screws 52.

In this respect it will be noted that the grid capacitor, as shown in Fig. 4, in effect provides a coupling arrangement between the plate or output cavity and the grid or input cavity. If the assembly is to be used as primarily an amplifier, then this coupling here provided should be minimized by decreasing the thickness of the dielectric material used or by increasing the exposed area of that material. On the other hand, if the assembly is to be used as primarily an oscillator, then the feedback of energy between the plate and grid cavities should be increased by increasing the coupling effect provided by this grid capacitor, which may be accomplished by providing a thicker dielectric member or a smaller exposed area to give a smaller effective capacity to this grid capacitance.

Figure 5:
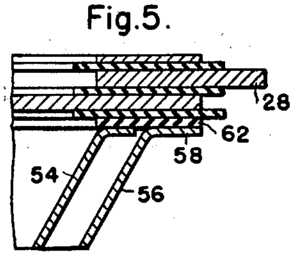
Fig. 5 is a view similar to Fig. 3 but pertaining to the filament connection.

Fig. 5 illustrates a possible arrangement for the bypassing of both of the filament leads to the end plate 28, one of these leads being shown as conductor 56 having a flanged end 58 insulated from the end plate 28 by suitable dielectric material 62, as above described in connection with the plate and grid by-passing. The element 54 provides an air duct between itself and 56 for providing adequate cooling of the filament seal. Electrical conduction to the filament or cathode lead 16 may be provided in any desired manner as by means of post 63 or the like passing through these multilayer structures but insulated therefrom.

Figure 9:
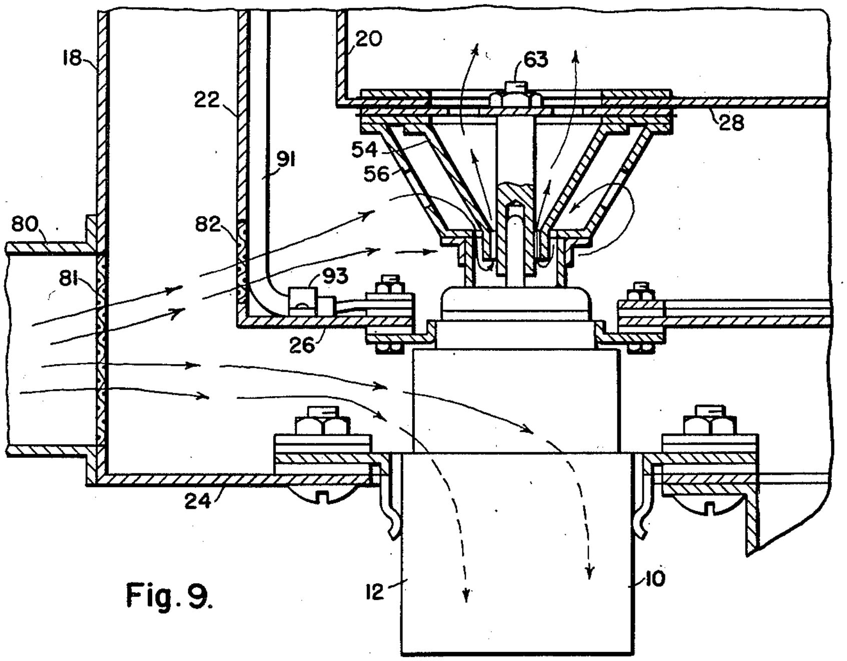
Fig. 9 is an enlarged fragmentary view illustrating a preferred form of the cooling arrangement.

A suitable cooling system is provided, and is shown in Figs. 1 and 9 as a forced air cooling system. One or more duct members 80 are provided for feeding cooling air into the cavities through suitable openings in the plate cavity wall 18; said openings being covered by means of a conductive screen or similar member 81, which allows the passage of the cooling air into the plate cavity from the ducts 80, but still maintains uninterrupted the conductive wall 18 or surface for the involved radio frequency currents.

A first portion of the cooling air which enters the plate cavity from the duct members 80 passes through the anode radiators or shell portions 12 of each tube to cool the anode of that tube. A second portion of the cooling air which enters the plate cavity passes through suitable openings in the intermediate wall 22, which are covered by a conductive screen or similar member 82, and this air then passes into the grid tuning cavity. The latter or second portion of the cooling air then passes through the air duct or baffle provided between elements 54 and 56, to provide adequate cooling of the filament seal of each tube. In this respect the element 54 may be made in the form of a cone-like structure, and the element 56 may be made in the form of a cone-like structure having openings therein for the passage of cooling air into the space between these two elements from the opening in wall 22 which is covered by screen member 82. Or the latter element 56 may be constructed of separate section members with spaces therebetween for the passage of the cooling air. The latter portion of the cooling air, which in actual practice may be but a small part of the total cooling air required, then passes away from the tube members and through a provided opening or openings in the end plate 28 as desired.

For satisfactory operation of the provided cooling system, suitable seal means should be provided in relation to particularly the output transmission line 70, since otherwise a relatively unrestricted path for the escape of the cooling air would be here provided. Such escape can be prevented by an electrically insulating seal member 83 positioned at the end of the output line 70 or somewhere along the length of that line. As shown in Fig. 1, such a seal member 83 can be positioned along the output transmission line 70, a short distance away from the end of the line where it is coupled to the plate cavity. The extensible metal bellows 74 at this coupling end of the line 70 requires that, if the air sealing member 83 be positioned at the end of the line 70, the sealing member 83 should be sufficiently flexible that the axial adjustment operation of the metal bellows 74 is not hindered thereby. One advantage of positioning the air sealing member 83 at the coupling end of the transmission line 70 is that, if desired, assistance can in this manner be provided to maintain the axial alignment of the inner and outer conductors of the transmission line 70, and more particularly to maintain the axial position of the metal bellows 74 relative to the outer conductor of line 70 and to maintain the desired relative axial position of capacitor plate 72 for impedance matching purposes.

It may be desirable to provide an air sealing member in the input transmission line 68, in a manner similar to that above described with regard to the output line 70.

The sealing member is not shown by the drawings in the input line 68, but it is to be understood that in actual practice such a member may be provided.

Figure 10:
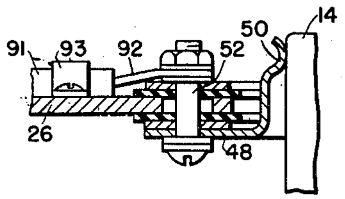
Fig. 10 is an enlarged fragmentary view of the grid connection shown in Fig. 1.

The required connections to the filaments of the tubes, and to their plate shells 12 are readily made without passing into either of the tuning cavities, but the conductive direct current bias connection to the grid shell 14 must pass through the grid cavity defined by walls 20 and 22 and by end plates 26 and 28 or the plate cavity defined by walls 18 and 22 and end plates 24 and 26. This bias connection, since it passes through the plate or grid tuning cavity, will have a radio frequency voltage induced therein. Suitable radio frequency choke means can be provided, in accordance with the above referred to pending application, to prevent the flow of appreciable radio frequency currents in this connection to the grid of each tube. However, the latter arrangement, using suitable choke means, operates satisfactorily in the lower bands of operational frequencies, but at higher frequencies the capacity effects may become troublesome. To overcome these capacity effects, a shielded grid wire connection 91 can be electrically connected to grid 14 of each of the tubes 10. The shielding of this grid wire 91 is electrically connected to the end plate 26 of the grid tuning cavity. As more clearly shown in Fig. 10, the grid wire 91 is connected through a terminal section 92 to the mounting screw 52 and through this to the flange 48 and spring contact ring 50 to the grid 14. A clamp 93 or other suitable fastener means electrically connects the shielding of grid wire 91 to the end plate 26.

The shielded grid wire 91 may be fixedly positioned along the end plate 26 and wall 22 of the grid tuning cavity as shown in Fig. 1 and passes through a provided opening in the end wall 30. Proper electrical connection can be made to this grid wire 91 for supplying the desired bias signal to the grid 14 of each of the tubes.

The grid cavity annular tuning bar 38 can be provided with a suitable opening or cut away portion through which the grid wire 91 passes; this can be done without materially affecting the involved electrical circuitry provided the opening or cut away portion is kept reasonably small and in conformance with the physical size of the shielded grid wire 91.

If separate grid metering circuits are to be provided, then a shielded grid wire 91 must be provided for each of the tubes. Otherwise, a single shielded grid wire 91 can be provided, with an electrical connection being made from this single grid wire 91 to a common connector ring 94 or member as shown in Fig. 1 which is electrically connected to the grids 14 of each of the tubes 10.

The grid wire or wires 91 can be positioned on either the plate cavity side or the grid cavity side of the intermediate wall 22; however, the grid cavity side as shown in Fig. 1 is preferred since it involves a lower impedance circuit and less radio frequency energy. In theory, if the grid wire or wires 91 could be positioned sufficiently close to the intermediate wall 22, the wires 91 would not have to be shielded. However, in the actual practice of the invention, it is probably easier to shield these wires.

An important feature of the above arrangement is the manner in which it enables the input and output lines to be arranged without disturbing the symmetry of the entire amplifier. As best shown in Fig. 1, the input to the grid cavity comprises a quarter-wave length of concentric line 68 which matches the low impedance of the amplifier grid circuit to a 50 ohm concentric line from the driver stage. For frequency modulated applications, this line is made a quarter-wave long at the frequency corresponding to the center of the FM band, and its impedance remains sufficiently constant over the whole FM band so that no adjustment is necessary.

The high frequency power output from the plate cavity is transmitted by a concentric output line designated by numeral 70. Since the impedance looking into this line is considerably lower than the proper load impedance for the tubes, and since it is subject to variation, a variable capacitor plate 72 is provided which, in conjunction with the tuning adjustment provided by the plate cavity tuning bar 32, enables the impedance of the output line to be properly matched to the parallel connected outputs of the tubes. This capacitor plate 72 is connected to the center conductor of the concentric line 70 by an extensible metal bellows 74, and is adjusted by a rack and pinion arrangement 76 inside the inner conductor. The pinion shaft may conveniently be made adjustable from the exterior by forming it of low loss insulating material so that it may be passed through apertures in the inner and outer conductor without affecting the transmission of high frequency energy over the line.

Figure 6:
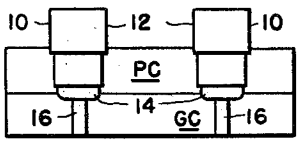
Figs. 6, 7 and 8 are schematic views of other possible configurations which may be assumed by the resonant cavity tank circuit in accordance with the invention.
Figure 7:
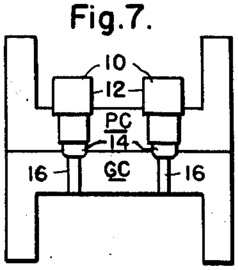
Figure 8:
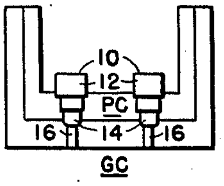

The particular configuration of the plate and grid tuning cavities shown above is, of course, merely exemplary of the possible arrangements. Figs. 6, 7 and 8 illustrate schematically three other possible arrangements thereof, the plate, grid and cathode of the tubes therein being denoted by the numerals 12, 14 and 16, respectively. The plate and grid tuning cavities in these figures are denoted by the symbols PC and GC, respectively, and it will be observed that all of the illustrated arrangements preserve the symmetry of arrangement which is responsible for the efficient and economical amplifier described in detail in connection with the previous embodiment.

Various modifications in the manner of connecting to the tube elements, in the tuning of the cavities and in the couplings to the input and output lines, as well as in other details of construction, can be effected without departing from the spirit of my invention as defined in the appended claims.

By the term radio-frequency generator, as used in the following claims, it is intended to mean broadly apparatus designed for operation either as an amplifier or as an oscillator.

I claim as my invention:

1. A radio frequency amplifier comprising a plurality of electron tubes equally spaced about a central axis, each of said tubes having an anode, a grid and a cathode, a resonator comprising an annular resonant tuning cavity having an axis coincident with said central axis, said cavity having a first cylindrical conductor electrically connected to the cathode of each of said tubes, said cavity having a second cylindrical conductor electrically connected to the grid of each of said tubes, with a grid bias connection physically passing in substantially an axial direction along the second cylindrical conductor, said grid bias connection being electrically connected to said grid.

2. The apparatus of claim 1, with a tuning member positioned between said cylindrical conductors and electrically connecting said conductors, said tuning member being axially movable to tune said cavity and being provided with an opening for the passage of said grid bias connection along the second cylindrical conductor.

3. The amplifier of claim 1, with the grid connection including an electrical shield.

4. The amplifier of claim 3 with said grid connection shield being electrically connected to the second cylindrical conductor.

5. A radio frequency amplifier comprising a plurality of electron tubes equally spaced about a central axis, each of said tubes having an anode, a grid and a cathode, a first annular resonant tuning cavity having an axis coincident with said central axis, said first cavity having a first cylindrical conductor electrically connected to the cathode of each of said tubes, said first cavity having a second cylindrical conductor electrically connected to the grid of each of said tubes, a second annular resonant tuning cavity having an axis coincident with said central axis, said cavity including said second cylindrical conductor and a third cylindrical conductor electrically connected to the anode of each of said tubes, a grid connection physically passing in substantially an axial direction along the second cylindrical conductor, said grid connection having one end electrically connected to said grid.

6. The amplifier in accordance with claim 5 including a tuning member positioned between said first and second cylindrical conductors and movable relative thereto in an axial direction, said tuning member having an opening for the passage of said grid connection along the second cylindrical conductor.

7. A radio frequency amplifier comprising a plurality of electron tubes equally spaced about a central axis, each of said tubes having an anode, a grid and a cathode, a first annular resonant tuning cavity having an axis coincident with said central axis, said first cavity having a first cylindrical conductor electrically connected to the cathode of each of said tubes, said first cavity having a second cylindrical conductor electrically connected to the grid of each of said tubes, a second annular resonant tuning cavity having an axis coincident with said central axis, said second cavity including said second cylindrical conductor, and a third cylindrical conductor being electrically connected to the plate of each of said tubes, a grid connection physically passing along the second cylindrical conductor in substantially an axial direction and between said first and second cylindrical conductors, said grid connection being electrically connected to said grid.

8. An amplifier in accordance with claim 5, characterized by the grid connection passing along the second cylindrical conductor and between said second and third cylindrical conductors.

9. A radio frequency amplifier comprising a plurality of electron tubes equally spaced about a central axis, each of said tubes having a control grid and a cathode, a resonator comprising an annular resonant tuning cavity having an axis incident with said central axis, said cavity having a first cylindrical conductor electrically connected to the cathode of each of said tubes, said cavity having a second cylindrical conductor electrically connected to the control grid of each of said tubes with a grid bias connection physically passing along said second cylindrical conductor within said cavity and being electrically connected to said control grid.

10. A radio frequency amplifier comprising a plurality of electron tubes equally spaced about a central axis, each of said tubes having a control grid and a cathode, a resonator comprising an annular resonant tuning cavity having an axis incident with said central axis, said cavity having a first cylindrical conductor electrically connected to the cathode of each of said tubes, said cavity having a second cylindrical conductor and a conductor member extending transversely of said axis and electrically connected between said second cylindrical conductor and the control grid of each of said tubes, with a grid bias connection physically passing along the second cylindrical conductor and along the conductor member, said grid bias connection being electrically connected to said control grid.

11. A radio frequency amplifier comprising a plurality of electron tubes equally spaced about a central axis, each of said tubes having a control grid and a cathode, a resonator comprising an annular resonant tuning cavity having an axis incident with said central axis, said cavity having a first cylindrical conductor electrically connected to the cathode of each of said tubes, said cavity having a second cylindrical conductor and a conductor member extending transversely of said axis, said conductor member being electrically connected between said second cylindrical conductor and the control grid of each of said tubes, with a grid bias connection having an electrical shield physically passing along the second cylindrical conductor and along the conductor member, said grid bias connection being electrically connected to said grid.

12. The apparatus of claim 10 with said grid bias connection including an electrical shield, which electrical shield is electrically connected to said conductor member.

References Cited in the file of this patent

UNITED STATES PATENTS

| | | |
|---|---|---|
| 2,284,405 | McArthur | May 26, 1942 |
| 2,408,355 | Turner | Sept. 29, 1946 |
| 2,415,485 | Haller | Feb. 11, 1947 |
| 2,424,089 | Gethmann | July 15, 1947 |
| 2,432,193 | Gubin | Dec. 9, 1947 |
| 2,434,116 | McArthur | Jan. 6, 1948 |
| 2,487,619 | Usselman | Nov. 8, 1949 |
| 2,554,500 | Priest et al. | May 29, 1951 |
| 2,641,657 | Priest et al. | June 9, 1953 |
| 2,662,937 | Horvath | Dec. 15, 1953 |
| 2,706,802 | Meisenheimer | Apr. 19, 1955 |